(12) United States Patent
Petit et al.

(10) Patent No.: US 6,929,156 B2
(45) Date of Patent: Aug. 16, 2005

(54) FLUID DISPENSER PUMP

(75) Inventors: Ludovic Petit, Vitot (FR); Katia Thomas, Epegard (FR)

(73) Assignee: Valois Sas, Le Neubourg (FR)

( * ) Notice: Subject to any disclaimer, the term of this patent is extended or adjusted under 35 U.S.C. 154(b) by 153 days.

(21) Appl. No.: 10/414,296

(22) Filed: Apr. 16, 2003

(65) Prior Publication Data

US 2003/0197033 A1 Oct. 23, 2003

Related U.S. Application Data

(60) Provisional application No. 60/387,888, filed on Jun. 13, 2002.

(30) Foreign Application Priority Data

Apr. 17, 2002 (FR) .............................. 02 04808

(51) Int. Cl.⁷ .............................................. B65D 88/54
(52) U.S. Cl. .................................... 222/321.9; 222/385
(58) Field of Search .......................... 222/321.7, 321.9, 222/321.2, 383.1, 385

(56) References Cited

U.S. PATENT DOCUMENTS

| | | | | |
|---|---|---|---|---|
| 3,044,413 A | * | 7/1962 | Corsette | ..................... 417/569 |
| 3,583,605 A | * | 6/1971 | Corsette | .................. 222/321.9 |
| 4,434,916 A | * | 3/1984 | Ruscitti et al. | .......... 222/321.9 |
| 5,234,135 A | * | 8/1993 | LaFosse et al. | .......... 222/321.2 |
| 5,511,698 A | * | 4/1996 | Solignac | ...................... 222/162 |
| 5,671,874 A | * | 9/1997 | Behar et al. | ................. 222/341 |
| 6,036,059 A | * | 3/2000 | VanBrocklin | ............. 222/321.9 |
| 6,145,710 A | * | 11/2000 | Carter | ...................... 222/321.9 |
| 6,334,549 B1 | * | 1/2002 | Fernandez et al. | ..... 222/153.13 |
| 6,398,079 B1 | * | 6/2002 | Garcia et al. | ............... 222/190 |
| 6,536,630 B1 | * | 3/2003 | Chan et al. | .................. 222/207 |
| 6,634,872 B1 | * | 10/2003 | Bougamont et al. | ........ 417/549 |

FOREIGN PATENT DOCUMENTS

FR      2 560 160 A      8/1985

* cited by examiner

Primary Examiner—Frederick Nicolas
(74) Attorney, Agent, or Firm—Sughrue Mion, PLLC

(57) ABSTRACT

A manually-actuated fluid dispenser pump including a pump body (10) and a piston (50) mounted to slide in leaktight manner in the pump body (10) between a rest position and a dispensing position. The piston is provided with a top sealing lip (52) in leaktight contact with the pump body (10). The pump includes an abutment member (80), fitted into the top edge of the pump body (10) and co-operating with the piston (50) to define its rest position. The top lip (52) of the piston (50) is made up of a first lip portion (53) co-operating in leaktight manner with the pump body (10) and of a second lip portion (54) co-operating in leaktight manner with the abutment in the rest position, and wherein the first and second lip portions (53, 54) are substantially parallel and spaced apart radially from each other.

9 Claims, 1 Drawing Sheet

FLUID DISPENSER PUMP

CROSS REFERENCE TO RELATED APPLICATION

This application claims the benefit under 35 U.S.C. §119 (e) of U.S. provisional patent application Ser. No. 60/387,888, filed Jun. 13, 2002, now abandoned, and priority under 35 U.S.C. §119(a)–(d) of French patent application No. FR-02.04808, filed Apr. 17, 2002.

TECHNICAL FIELD

The present invention relates to a manually-actuated fluid dispenser pump and to a fluid dispenser pump including such a pump.

BACKGROUND OF THE INVENTION

In known manner, a pump generally includes a pump body in which a piston is mounted to slide between a rest position and a dispensing position for dispensing the fluid contained in the pump, in particular in a pump chamber. An abutment member is generally fitted into the top edge of the pump body to define the rest position of the piston. This abutment member may, for example, be in the form of a ferrule that co-operates with the piston when said piston is in the rest position. Usually, the piston is provided with a bottom sealing lip and with a top sealing lip, the top sealing lip providing sealing between the piston and the pump body. The sealing between the piston and the ferrule is generally provided at radial contact surfaces between a bottom radial edge of the ferrule and a corresponding radial surface of the piston. That configuration can suffer from drawbacks. Firstly, the sealing between the piston and the ferrule is not good because it is not provided by means of a deformable flexible portion such as a sealing lip, as it is with the pump body. Secondly, in order to guarantee good leaktightness between the ferrule and the piston, it is necessary, when the piston is in the rest position, to have a relatively large force exerted by the return spring of the pump to enable the radial contact surfaces of the ferrule and of the piston to provide sufficient leaktightness. A relatively high force when the pump is in the rest position requires a large force to actuate the pump because the return spring cannot be completely relaxed in the rest position. In addition, since the abutment position is defined by the point of sealing between the ferrule and the piston, the manufacturing tolerances of the various components mean that the abutment position is not constant, but rather that it can vary as a function of said manufacturing tolerances. Modifying, even slightly, the rest position of the pump can have consequences on the metering of the fluid when the pump is actuated.

BRIEF SUMMARY OF THE INVENTION

An object of the present invention is to provide a fluid dispenser pump that does not suffer from the above-mentioned drawbacks.

An object of the present invention is thus to provide a fluid dispenser pump that improves leaktightness between the piston, the pump body, and the abutment member, in particular the ferrule.

An object of the present invention is also to provide such a fluid dispenser pump in which the actuating force, i.e. the force that the user must exert to actuate the pump, is reduced.

An object of the present invention is also to provide such a fluid dispenser pump in which the abutment position, namely the rest position of the piston of the pump, remains constant in spite of the manufacturing tolerances of the various components, namely the pump body, the piston, and the ferrule.

An object of the present invention is also to provide such a fluid dispenser pump that is simple and inexpensive to manufacture and to assemble.

The present invention thus provides a manually-actuated fluid dispenser pump including a pump body and a piston mounted to slide in leaktight manner in said pump body between a rest position and a dispensing position, said piston being provided with at least a top sealing lip in leaktight contact with said pump body, said pump including an abutment member such as a ferrule, fitted into the top edge of the pump body and co-operating with said piston to define its rest position, said fluid dispenser pump being characterized in that the top lip of the piston is made up of a first lip portion co-operating in leaktight manner with the pump body and of a second lip portion co-operating in leaktight manner with said ferrule in the rest position, said first and second lip portions being substantially parallel and spaced apart radially from each other.

Advantageously, the second lip portion is thinner than the first lip portion so that it is more flexible and is deformed to compensate for the manufacturing tolerances of the ferrule and/or of the pump body and/or of the piston.

The present invention also provides a fluid dispenser device including a pump as defined above.

BRIEF DESCRIPTION OF THE DRAWINGS

Other characteristics and advantages of the present invention will appear more clearly on reading the following detailed description of an advantageous embodiment of it, given with reference to the accompanying drawing, in which.

DETAILED DESCRIPTION

Figures 1, 2:
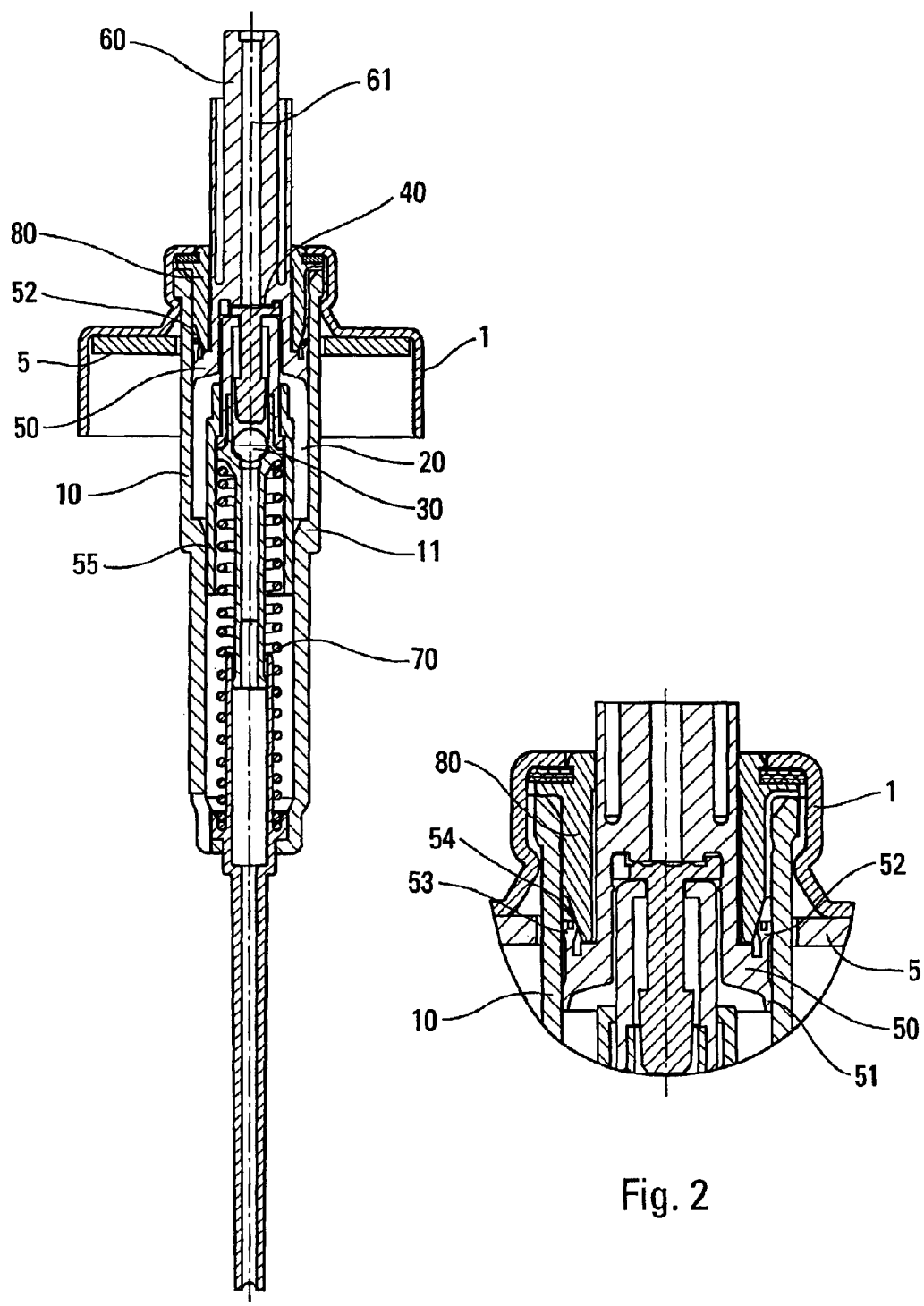
FIG. 1 is a diagrammatic section view of a fluid dispenser pump to which the present invention applies.
FIG. 2 is a diagrammatic view on an enlarged scale of a portion of the pump of FIG. 1, showing the invention in an advantageous embodiment of it.

FIG. 1 shows a particular fluid dispenser pump to which the present invention is adapted. However, it is clear that the present invention is applicable to any fluid dispenser pump in which a piston is mounted to slide in a pump body, and in which the rest position of the piston is defined by an abutment member, e.g. a ferrule. The present invention is thus in no way limited to the pump shown in FIG. 1 and described below.

The pump shown in FIG. 1 includes a pump body 10 in which a piston 50 is mounted to slide between a rest position and a dispensing position. The rest position is defined by an abutment member which, in the example shown, is a ferrule 80 fitted into the top edge of the pump body. The dispensing position may be defined by a radial shoulder 11 provided in the pump body and against which the piston 50 comes into abutment when it is in the dispensing position. A second piston 55 is mounted to slide in a small-diameter portion of the pump body, and a pump chamber 20 is defined between the piston 50 and the piston 55. The pump chamber is provided with an inlet valve 30 and with an outlet valve 40. The piston 50 is connected, preferably in integral manner, to a preferably hollow actuating rod 60 which is provided with an expulsion channel 61. A return spring 70 is provided return the pump automatically to its rest position after each occasion on which it is actuated. The pump shown in FIG. 1 may be assembled to a reservoir (not shown) by means of a fixing ring 1 which may be of any type, and in particular screw-fastenable, crimpable, or snap-fastenable. Generally, a sealing gasket 5 is interposed between the fixing ring 1 and the top edge of the reservoir (not shown). When the user wishes to use the pump of FIG. 1, the user exerts an axial force on the actuating rod 60, which force is transmitted to the piston 50. The second piston 55 moves faster than the piston 50 because of the differences in diameter, and the second piston 55 is suitable for opening the outlet valve 40 mechanically when the piston 50 reaches the end of its actuating stroke so as to dispense the fluid contained in the pump chamber 20. When the user releases the force on the actuating rod 60, the pump is returned to the rest position by the return spring 70.

FIG. 2 shows the pump portion incorporating the present invention on an enlarged scale. In the present invention, the top sealing lip 52 of the piston 50 is made up of a first lip portion 53 and of a second lip portion 54. The first lip portion 53 co-operates in leaktight manner with the pump body 10 when the position 50 is in any position. The second lip portion 54 co-operates in leaktight manner with the ferrule 80 when the piston 50 is in the rest position. As shown in FIG. 2, the first and second lip portions 53, 54 are substantially parallel, and they are spaced apart radially relative to each other. Thus, the sealing between the piston 50 and the ferrule 80 is provided at the second lip portion 54 and does not necessarily have to be provided at the radial bottom edge of the ferrule 80 as used to be the case. Leaktightness is thus improved, because it is obtained by means of a flexible and deformable lip 54, which guarantees better sealing performance. As a result, the return spring 70 of the pump may be of lower stiffness because it is no longer necessary to exert a relatively large force on the piston 50 when it is in the rest position in order to make it provide the sealing with the ferrule 80. The force required to actuate the pump is thus reduced by means of the present invention. In addition, the sealing point where sealing is provided between the piston 50 and the ferrule 80 is displaced to the second lip portion 54. Sealing is thus no longer provided at the abutment point where the radial bottom edge of the ferrule 80 is in abutment with the piston 50, so that the manufacturing tolerances of the various components of the pump, namely the pump body 10, the piston 50, or the ferrule 80 can be compensated by the structure of the top lip 52, and in particular by said two lip portions 53 and 54. Advantageously, the second lip portion 54 may be thinner than the first lip portion 53 so that it is more flexible. In which case, it can be deformed to compensate for the manufacturing tolerances of the ferrule 80 and/or of the pump body 10 and/or of the piston 50. Naturally, the flexibility, and more generally the dimensions of the two lip portions 53 and 54 and of the piston 50 may be adapted as a function of requirements. In particular, the two lip portions 53 and 54 are not necessarily of identical length, as shown in FIG. 2, but rather they may have different lengths or shapes as a function of the shape of the ferrule and/or of the shape of the pump body.

Although the present invention is described with reference to a particular embodiment of it, it should be understood that the person skilled in the art may make any modifications to it without going beyond the ambit of the present invention as defined by the accompanying claims.

What is claimed is:

1. A manually-actuated fluid dispenser pump including a pump body (10) and a piston (50) mounted to slide in leaktight manner in said pump body (10) between a rest position and a dispensing position, said piston being provided with at least a top sealing lip (52) in leaktight contact with said pump body (10), said pump including an abutment member (80) fitted into the top edge of the pump body (10) and co-operating with said piston (50) to define rest position of the piston, said fluid dispenser pump being characterized in that the top lip (52) of the piston (50) is made up of a first lip portion (53) co-operating in leaktight manner with the pump body (10) and of a second lip portion (54) co-operating in leaktight manner with said abutment member (80) in the rest position, said first and second lip portions (53, 54) being substantially parallel and spaced apart radially from each other.

2. A pump according to claim 1, in which the second lip portion (54) is thinner than the first lip portion (53) so that the second lip portion is more flexible and is deformed to compensate for the manufacturing tolerances of the abutment member (80) or of the pump body (10) or of the piston (50).

3. A fluid dispenser device, characterized in that the fluid dispenser device includes the pump according to claim 1.

4. The pump according to claim 1, wherein the abutment member is a ferrule.

5. The pump according to claim 1, in which the second lip portion is thinner than the first lip portion so that the second lip portion is more flexible and is deformed to compensate for the manufacturing tolerances of the abutment member and of the pump body.

6. The pump according to claim 1, in which the second lip portion is thinner than the first lip portion so that the second lip portion is more flexible and is deformed to compensate for the manufacturing tolerances of the abutment member and of the pump body and of the piston.

7. The pump according to claim 1, in which the second lip portion is thinner than the first lip portion so that the second lip portion is more flexible and is deformed to compensate for the manufacturing tolerances of the abutment member and of the piston.

8. The pump according to claim 4, wherein the second lip portion co-operates with the ferrule so as to axial move into leaktight contact with the ferrule when the piston is axially moved into the rest position and to disengage from the ferrule when the piston is axially move from the rest position.

9. The pump according to claim 8, wherein the first lip portion co-operates with the pump body to remain in leaktight contact with the pump body when the piston is axially moved into the rest position and disengaged from the rest position.

* * * * *